(12) United States Patent
Scherer et al.

(10) Patent No.: US 11,643,255 B2
(45) Date of Patent: *May 9, 2023

(54) CLOSURE DEVICES

(71) Applicant: HUSKY INJECTION MOLDING SYSTEMS LTD., Bolton (CA)

(72) Inventors: Stephan Scherer, Trierweiler (DE); Patrick Gottschald, Rehlingen-Siersburg (DE)

(73) Assignee: HUSKY INJECTION MOLDING SYSTEMS LTD., Bolton (CA)

( * ) Notice: Subject to any disclaimer, the term of this patent is extended or adjusted under 35 U.S.C. 154(b) by 47 days.

This patent is subject to a terminal disclaimer.

(21) Appl. No.: 17/386,898

(22) Filed: Jul. 28, 2021

(65) Prior Publication Data

US 2021/0354884 A1 Nov. 18, 2021

Related U.S. Application Data

(63) Continuation of application No. 16/500,610, filed as application No. PCT/CA2017/050619 on May 23, 2017, now Pat. No. 11,198,543.

(30) Foreign Application Priority Data

Apr. 13, 2017 (JP) .............................. JP2017-080003

(51) Int. Cl.
*B65D 41/34* (2006.01)
*B29C 33/00* (2006.01)
(Continued)

(52) U.S. Cl.
CPC ...... *B65D 41/3447* (2013.01); *B29C 33/0033* (2013.01); *B65D 41/005* (2013.01);
(Continued)

(58) Field of Classification Search
CPC ................ B65D 41/32; B65D 41/6452; B65D 41/3447; B65D 41/3428; B65D 41/06;
(Continued)

(56) References Cited

U.S. PATENT DOCUMENTS

| 4,865,361 A | 7/1989 | Haffner |
| 4,899,898 A | 2/1990 | Thompson |

(Continued)

FOREIGN PATENT DOCUMENTS

| CA | 2717859 A | 11/2011 |
| EP | 0408364 A1 | 1/1991 |

(Continued)

OTHER PUBLICATIONS

The Cary Company; 38mm Brown Ipec Snap Screw 38-ISS Drop Lock Tamper Evident Plastic Cap 2016.

(Continued)

*Primary Examiner* — Robert J Hicks

(57) ABSTRACT

A closure for sealingly closing a container neck having a tubular body with a top wall, an annular side wall, an intermediate wall joining the side wall to the top wall and an annular tamper evidence band frangibly connected to an open end described by the side wall. The band includes retaining cams protruding from its inner surface. Each cam has a lead-in ramp for engaging, in use, the flange of a container neck as the neck is introduced into the open end of the body and a stop for engaging the flange to separate the band from the body when the closure is subsequently removed from the neck. Each lead-in ramp has a central recess therein.

23 Claims, 3 Drawing Sheets

(51) Int. Cl.
   *B65D 41/00* (2006.01)
   *B65D 55/02* (2006.01)
   *B29L 31/56* (2006.01)

(52) U.S. Cl.
   CPC ........ *B65D 55/02* (2013.01); *B29L 2031/565* (2013.01); *B65D 2251/20* (2013.01); *B65D 2401/20* (2020.05)

(58) Field of Classification Search
   CPC ............ B65D 41/0428; B65D 41/0421; B65D 41/04; B65D 41/005; B65D 55/02; B65D 1/0246; B65D 1/023; B65D 1/0223
   USPC ... 215/252, 253, 250, 344, 343, 341, 44, 43, 215/329, 316; 220/300, 293, 288, 296
   See application file for complete search history.

(56) References Cited

U.S. PATENT DOCUMENTS

| | | |
|---|---|---|
| 6,112,923 A | 9/2000 | Ma |
| 6,705,479 B2 | 3/2004 | Druitt et al. |
| 6,913,158 B1 | 7/2005 | Bosl et al. |
| 8,733,566 B2 | 5/2014 | Druitt et al. |
| 9,126,726 B2 | 9/2015 | Edie et al. |
| 2001/0015341 A1 | 8/2001 | Higgings |
| 2005/0189312 A1 | 9/2005 | Bixler et al. |
| 2009/0045158 A1 | 2/2009 | Suriol |
| 2012/0031871 A1 | 2/2012 | Molinaro et al. |
| 2014/0001182 A1 | 1/2014 | Wood et al. |

FOREIGN PATENT DOCUMENTS

| | | |
|---|---|---|
| EP | 2704961 B3 | 3/2014 |
| JP | S6470364 A | 3/1989 |
| JP | 2003175948 A1 | 6/2003 |
| JP | 2007176553 A | 7/2007 |
| JP | 2011136726 | 7/2011 |
| JP | 2013129430 | 7/2013 |
| JP | 2013542895 | 11/2013 |
| JP | 2016155589 | 9/2016 |
| WO | 2014060893 A1 | 4/2014 |
| WO | 2015061892 A1 | 5/2015 |
| WO | 2016026796 A1 | 2/2016 |

OTHER PUBLICATIONS

Salbro, Ring Around the Bottle; Tamper Evident Closures Sep. 2016.

CLOSURE DEVICES

CROSS-REFERENCE TO RELATED APPLICATIONS

This application is a continuation of U.S. patent application Ser. No. 16/500,610 filed 3 Oct. 2019, which is the U.S. National Stage of PCT/CA2017/050619, filed 23 May 2017, which claims priority from Japanese patent application 2017-080003 filed 13 Apr. 2017, the disclosures of which are incorporated herein by reference.

FIELD OF THE INVENTION

This invention relates generally to a closure and in particular to a closure for engaging the neck of a container. More specifically, although not exclusively, this invention relates to closures made from molded plastics material for sealingly closing beverage containers, such as glass or plastic bottles and the like.

BACKGROUND OF THE INVENTION

Plastic beverage bottles and closures are well known. There is an established need to reduce the material used in such bottle and closure designs in order to drive down manufacturing costs, reduce waste and meet legislative requirements. However, a reduction in material generally has an adverse effect on performance and so design parameters are normally established with a view to balancing these competing factors.

Plastic beverage closures normally include four main functional elements: a tubular body or shell, securing feature(s), sealing feature(s) and tamper evidence feature(s). The body or shell typically includes a top wall, usually circular, with an annular side wall depending from the top wall. The side wall is typically in the form of a cylindrical skirt extending perpendicularly from the peripheral edge of the top wall. The securing feature usually includes a screw thread but can in some cases include a snap on feature, both of which are known in the art. The securing feature is normally formed integrally with the side wall on the inner surface thereof and adjacent to the container opening, for example the neck of a bottle. Several different sealing features are known in the art which can be applied in isolation or in various combinations and several tamper evidence features have also been developed.

Recent efforts to reduce weight in plastic bottle designs have resulted in neck designs having a greatly reduced height. As a consequence, the requisite height of closures used with such container necks has also reduced. Whilst this reduction in height has the positive effect of reducing weight in the closure, it has been found to have an adverse impact on the ability of users to remove the closure from the container neck. More specifically, the reduction in the height of the side wall of the closure reduces the surface area available for the user to grip the closure in order to apply the release torque for removing the closure from the container neck.

As a result, the effect of any increase in the requisite release torque is much more acute in closures used in such applications. This can be particularly problematic with some designs of sealing and/or tamper evidence features which require high application and release torques to perform effectively.

One known tamper evidence feature includes a band frangibly connected to an open end of the tubular body of the closure by a series of bridges. The band includes a series of tabs connected by flexible hinges to a lower portion of the band and extend upwardly and inwardly thereof. The tabs engage an undercut surface of an external flange, or pilfer bead, on a container neck when the closure is secured thereto. With this arrangement, the action of unscrewing the closure from the container for the first time brings the tabs into contact with the flange, which prevents further upward movement of the tabs. Continued unscrewing of the closure beyond this point progressively places the frangible connection under tension and severs the bridges, thereby separating the tamper evident band from the body of the closure.

Typically, closures incorporating this tamper evidence design are molded with the tabs in a downward and inward orientation, wherein the tabs are subsequently folded upwardly into a use configuration. This, additional operation adds to the cost and complexity of the manufacturing process and US Patent Application No. 2001/0015341 A describes such a closure in which the tabs are molded in a use condition by forming recesses or openings in the band which form the tabs in a use position.

Another common tamper evidence feature includes a series of cams projecting from the inner surface of the band in place of the tabs. The cams are sloped to provide a series of lead-in ramps that engage the flange of the container neck as it is introduced into the closure body. The engagement between the lead-in ramps and the flange stretches the tamper evidence band until the cams pass over the flange, at which point they snap into engagement with the flange.

There is a security issue with such known tamper evidence feature designs in that it may be possible to remove the closure without damaging the band or frangible bridges. Such tampering can present a serious safety hazard, since circumventing the tamper evidence feature could enable contamination or replacement of the container contents and subsequent reapplication of the closure, leaving no evidence of tampering. Such removal may be achieved, for example, by inserting a blade between the band and the neck of the container and levering the band outwardly to expand and pass it over the flange of the container.

U.S. Pat. No. 6,705,479 seeks to overcome this issue by providing localized areas of thickening to enhance the longitudinal stiffness of the band and to inhibit insertion of a blade as described above. Whilst effective at mitigating the aforementioned security issue, these thickened areas have a deleterious effect on the requisite application torque and on the weight of the closure.

SUMMARY OF THE INVENTION

The present invention is directed, in particular but not exclusively, to a closure for sealingly closing a neck opening of a container. The present invention is also directed to a mold stack, a mold and a molding system for molding such a closure. Aspects of the invention provide a closure having a tubular body, which may have a closed end and an open end. The closure or body may have a top wall and a side wall or skirt. The side wall or skirt may be annular and/or may depend from the top wall. The body, for example the side wall or skirt, may include securing features, such as threads which may be formed on an inner surface thereof and/or which may include one or more turns each having a plurality of interruptions to form axial venting passages. The closure may have a tamper evidence band, which may be frangibly connected to the open end of the body, e.g. to the side wall or skirt. The tamper evidence band may have retaining cams protruding from its inner surface, which may be profiled for allowing a flange of the container neck to be introduced, in use, therepast and/or for engaging the flange to separate the tamper evidence band from the body when the closure is subsequently removed from the container. In addition, any of the foregoing features described in relation to known closures may be incorporated within a closure according to the invention, insofar as they are consistent with the disclosure herein.

According to a first broad aspect of the present invention, there is provided a closure for sealingly closing a neck opening of a container, the closure comprising a tubular body having a closed end and an open end and an annular tamper evidence band frangibly connected to the open end of the body, the tamper evidence band comprising a plurality of retaining cams each protruding from its inner surface and having a lead-in ramp for engaging, in use, the flange of a container neck as the neck is introduced into the open end of the body and a catch or stop for engaging the flange to separate the tamper evidence band from the body when the closure is subsequently removed from the container, wherein the lead-in ramp of at least one of the retaining cams has a recess therein.

The provision of a recess in the lead-in ramp enables a reduction in the amount of material necessary to form the cams, whilst retaining the requisite functional surfaces that enable the cams to perform their required function. Such reduction of material also reduces the risk of sink marks and enables the thickness of the tamper evidence band to be reduced further than is generally practicable with conventional cam designs.

The Applicant has observed that a reduced band thickness, together with the aforementioned cam shape more readily deforms plastically if manipulated to remove the band after installation. This enhances the visual indication of tampering, thereby increasing the effectiveness of the tamper evidence function. As will be appreciated by the skilled person, such plastic deformation is prevented during application of the closure to the container neck because engagement between the cams and the flange causes the band to stretch substantially uniformly about its circumference.

The recess may be in an intermediate or central portion of the retaining cam, for example the lead-in ramp thereof. The recess may comprise a scalloped-out portion. The recess or scalloped-out portion may be formed by removing molding material from the cam. The recess may describe or define two or more spaced ramp portions. The spaced ramp portions may be for contacting the flange of the container neck. At least part of the recess may be substantially contiguous or flush with the inner surface of the tamper evidence band.

The lead-in ramp may face an open or lower end of the tamper evidence band. The open or lower end of the tamper evidence band may comprise or describe an open end of the closure, for example which is distinct and/or spaced from the open end of the body. The catch or stop may face the closed end of the body. The catch or stop may span the spaced ramp portions. The at least one cam may be substantially U-shaped, for example wherein the catch or stop comprises or provides a base of the U and/or the ramp portions comprise or provide limbs thereof.

The ramp, for example at least one or each ramp portion, may comprise a ramp surface, e.g. for contacting the flange of the container neck. The ramp surface(s) may be sloped, for example toward the open or lower end of the tamper evidence band or closure. At least one or each ramp portion may have sides that are sloped or taper, for example toward one another and/or from the catch or stop toward the open or lower end of the tamper evidence band or closure.

The catch or stop may have a surface, e.g. an engagement surface, for engaging the flange. The surface for engaging the flange may be radial and/or extend radially or substantially perpendicularly from the tamper evidence band or its inner surface. The surface for engaging the flange may span the spaced ramp portions and/or the recess and may face the closed end of the body.

The closure may comprise a top wall, which may describe or define the closed end. The closure may comprise a side wall, e.g. an annular side wall, which may depend from the top wall and/or describe the open end of the body.

The body, e.g. the side wall, may comprise threads, which may include one or more turns, e.g. two or more turns. Each turn may have one or more, e.g. a plurality of, interruptions. The interruption(s) may form axial venting passages. The interruption(s) may each or together form the axial venting passages. At least one of the turns may include an uninterrupted portion aligned axially with an interruption in one or more of the other turns.

According to another broad aspect of the present invention, there is provided a closure for sealingly closing a neck opening of a container, the closure comprising a top wall and a side wall depending from the top wall, the side wall comprising threads including two or more turns each having a plurality of interruptions to form axial venting passages, wherein one of the turns includes an uninterrupted portion aligned axially with an interruption in another of the turns.

The Applicant has determined that the omission of an interruption in one of the turns is surprisingly effective at mitigating damage to the threads in the event of excessive torque being applied to the closure during application without compromising its ability to vent the pressurised contents of the container.

The top wall may comprise an abutment, which may depend therefrom. The abutment may have an abutment surface, e.g. for abutting against a top surface of the container neck.

The abutment may comprise one or more projections, e.g. a plurality of projections. The abutment may comprise at least three projections, for example four, five, six, seven or more projections. The projections may depend from and/or be spaced circumferentially about the top wall. At least one or each projection may provide part of the abutment surface. The projections may together provide a composite abutment surface for abutting against a top surface of the container neck.

The provision of a plurality of projections which each provide part of the abutment surface can reduce the release torque required to remove the closure from the container.

The closure may comprise an intermediate wall, for example between the side wall and the top wall, e.g. periphery of the top wall. The top wall may have a first diameter and/or the side wall may have a second diameter. The second diameter may be larger than the first diameter. The intermediate wall may comprise or provide a step, e.g. an annular step.

The step may have a first portion, which may be axial, depending from the top wall, e.g. the periphery thereof. The step may have a second portion, which may be radial, joining the first portion, e.g. the lower edge thereof, to the annular side wall. The radial portion may comprise the abutment surface.

The abutment may comprise or be provided by the step. In embodiments, the abutment surface is provided by the radial portion, e.g. it may be provided by or be contiguous or flush with the lower surface of the radial portion. In embodiments where the abutment comprises a plurality of projections, the projections may depend from the step or the radial portion, e.g. the lower surface of the radial portion. The projections may be spaced circumferentially about the top wall and/or the radial portion, e.g. the lower surface of the radial portion.

At least one or each projection may tapers or slope, e.g. from the top wall or the radial portion to its abutment surface.

The closure may comprise an extension, which may be described from the abutment surface to the top wall, e.g. to the top of the top wall. The closure may comprise an effective closure height, which may be described from the base or lower edge of the side wall to the top wall, e.g. to the top of the top wall. The extension may be at least 5% of the effective closure height. Preferably, the extension is at least 10% of the effective closure height. In embodiments, the extension is at least 15% for example at least 20% of the effective closure height. For certain applications, the extension is at least 25% of the effective closure height.

The closure may comprise a tamper evidence band depending from the base of the side wall. The tamper evidence band may be annular and/or may be frangibly connected to base or lower edge of the side wall or to the open end of the body. The tamper evidence band may comprise a plurality of retaining cams protruding from its inner surface. At least one retaining cam may have a lead-in ramp, e.g. for engaging, in use, the flange of a container neck as it is introduced into the open end of the body or into the side wall. At least one retaining cam may have a catch or stop, e.g. for engaging the flange to separate the tamper evidence band from the body when the closure is subsequently removed from the container. The lead-in ramp of at least one of the retaining cams may have a recess therein.

The closure may comprise an overall closure height, which may be described from the base or lower edge of the tamper evidence band to the top wall, e.g. the top of the top wall. The extension may be at least 5% of the overall closure height. Preferably, the extension is at least 10% of the overall closure height. In embodiments, the extension is at least 15% of the overall closure height. For certain applications, the extension is at least 20% of the overall closure height.

The closure may comprise an inner seal, which may be annular, depending from the radial portion, for example an inner part thereof. The closure may comprise an outer seal, which may be annular, depending from the radial portion, e.g. an outer or intermediate part thereof. The projections may be disposed between and/or spaced from each of the inner and outer seals.

The closure may comprise one or more, e.g. a plurality of, ribs. The ribs may be axial and/or external. The ribs may include first and second ribs. The first ribs may be longer than the second ribs. The first ribs may extend from the top wall toward or to the base or lower edge of the side wall. The second ribs may extend from the intermediate wall toward the base or lower edge of the side wall. At least one or each second rib may be between a pair of first ribs. The first ribs may comprise a quarter-round or quarter-disc portion extending from the step and/or between the intermediate wall and the top wall.

According to another broad aspect of the present invention, there is provided a closure for sealingly closing a neck opening of a container, the closure comprising a top wall, an annular side wall depending from the top wall, an intermediate wall between the side wall and the periphery of the top wall and a plurality of axial external ribs, the top wall having a first diameter and the annular side wall having a second diameter larger than the first diameter, the intermediate wall comprising an annular step having a first, axial portion depending from the periphery of the top wall and a second, radial portion joining the lower edge of the first portion to the annular side wall, wherein the plurality of ribs comprise first ribs extending from the top wall toward the base of the side wall and a second rib between each pair of first ribs, the second ribs being shorter than the first ribs and extending from the intermediate wall toward the base of the side wall.

The closure may be injection molded or compression molded or formed by any other suitable process. The closure may, but need not, be formed of a plastics material, such as high density polyethylene, polypropylene or any other suitable material. The closure may be for, e.g. adapted for use with, a bottle or container to be filled with a carbonated beverage. Alternatively, the closure may be for, e.g. adapted for use with, a bottle or container to be filled with a still beverage or other liquid, in which case the interruptions in the threads may be omitted or the threads may be replaced with other engaging features.

Another aspect of the invention provides a mold stack comprising a plurality of mold inserts which, when in a molding configuration, together describe a molding cavity for molding a closure as described above.

Another aspect of the invention provides a mold for molding a closure as described above. The mold may comprise a mold stack as described above. The mold may comprise a compression or injection mold.

Another aspect of the invention provides a molding system for molding a closure as described above. The molding system may comprise a mold as described above. The molding system may comprise a compression or injection molding system.

Another aspect of the invention provides a computer program element comprising and/or describing and/or defining a three-dimensional design for use with a simulation means or a three-dimensional additive or subtractive manufacturing means or device, e.g. a three-dimensional printer or CNC machine, the three-dimensional design comprising an embodiment of the closure described above.

For the avoidance of doubt, any of the features described herein apply equally to any aspect of the invention. Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. For the avoidance of doubt, the terms "may", "and/or", "e.g.", "for example" and any similar term as used herein should be interpreted as non-limiting such that any feature so-described need not be present. Indeed, any combination of optional features is expressly envisaged without departing from the scope of the invention, whether or not these are expressly claimed. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Embodiments of the invention will now be described by way of example only with reference to the accompanying drawings in which.

DETAILED DESCRIPTION OF THE INVENTION

Figure 1:
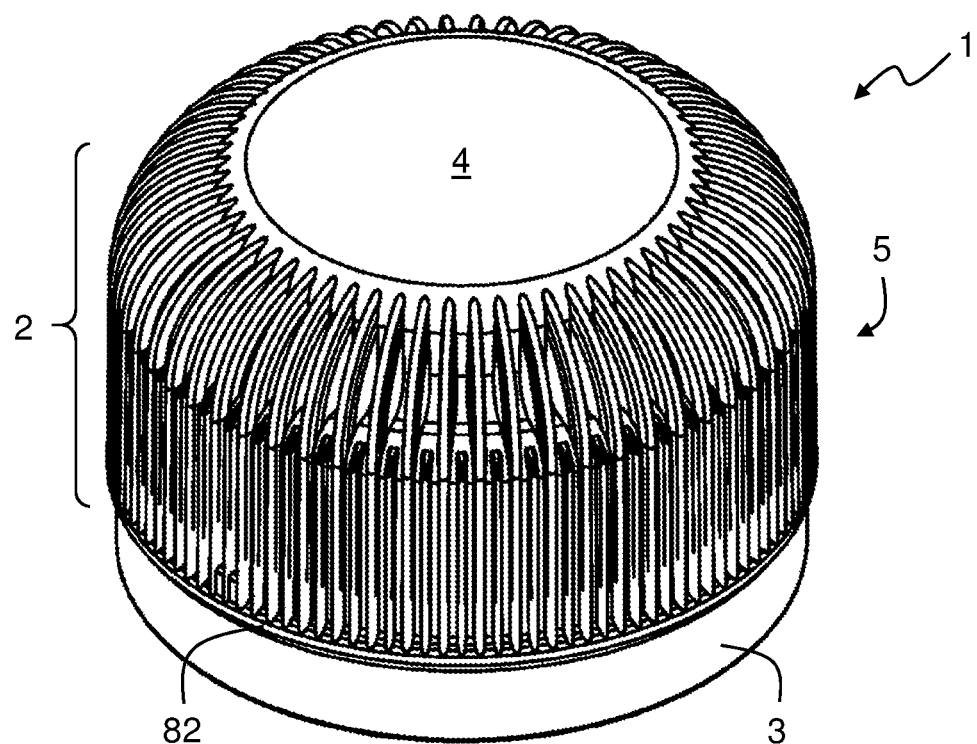
FIG. 1 depicts a perspective view of a closure according to an embodiment of the invention.
Figure 2:
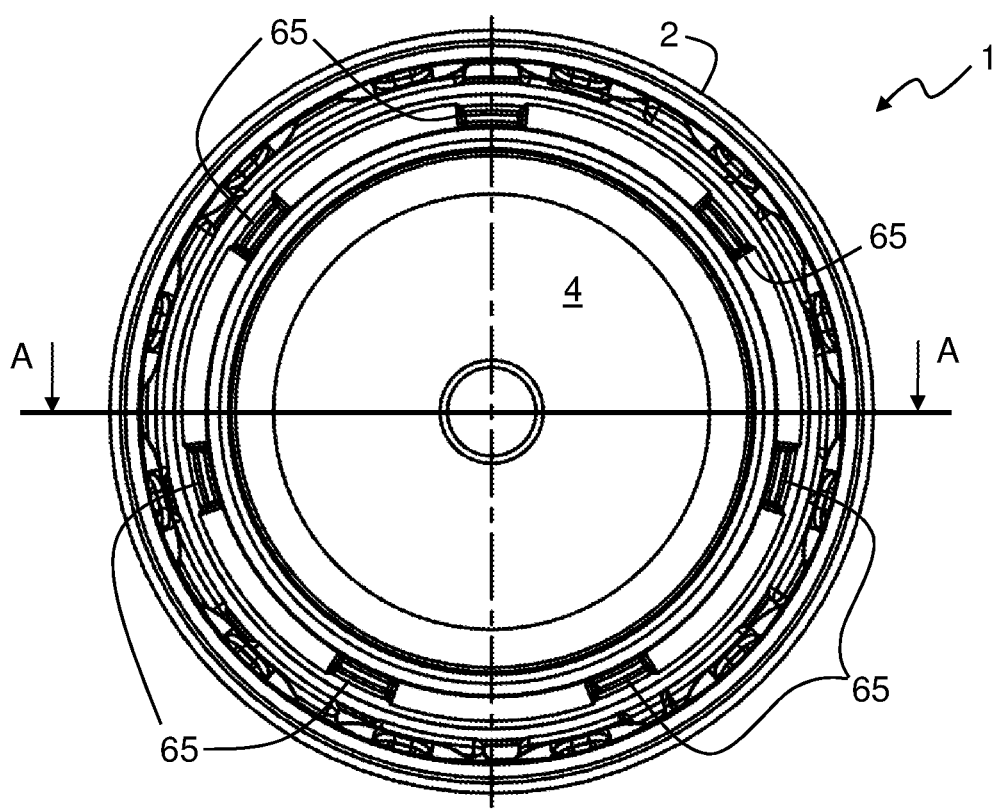
FIG. 2 depicts a bottom view of the closure of FIG. 1.
Figure 3:
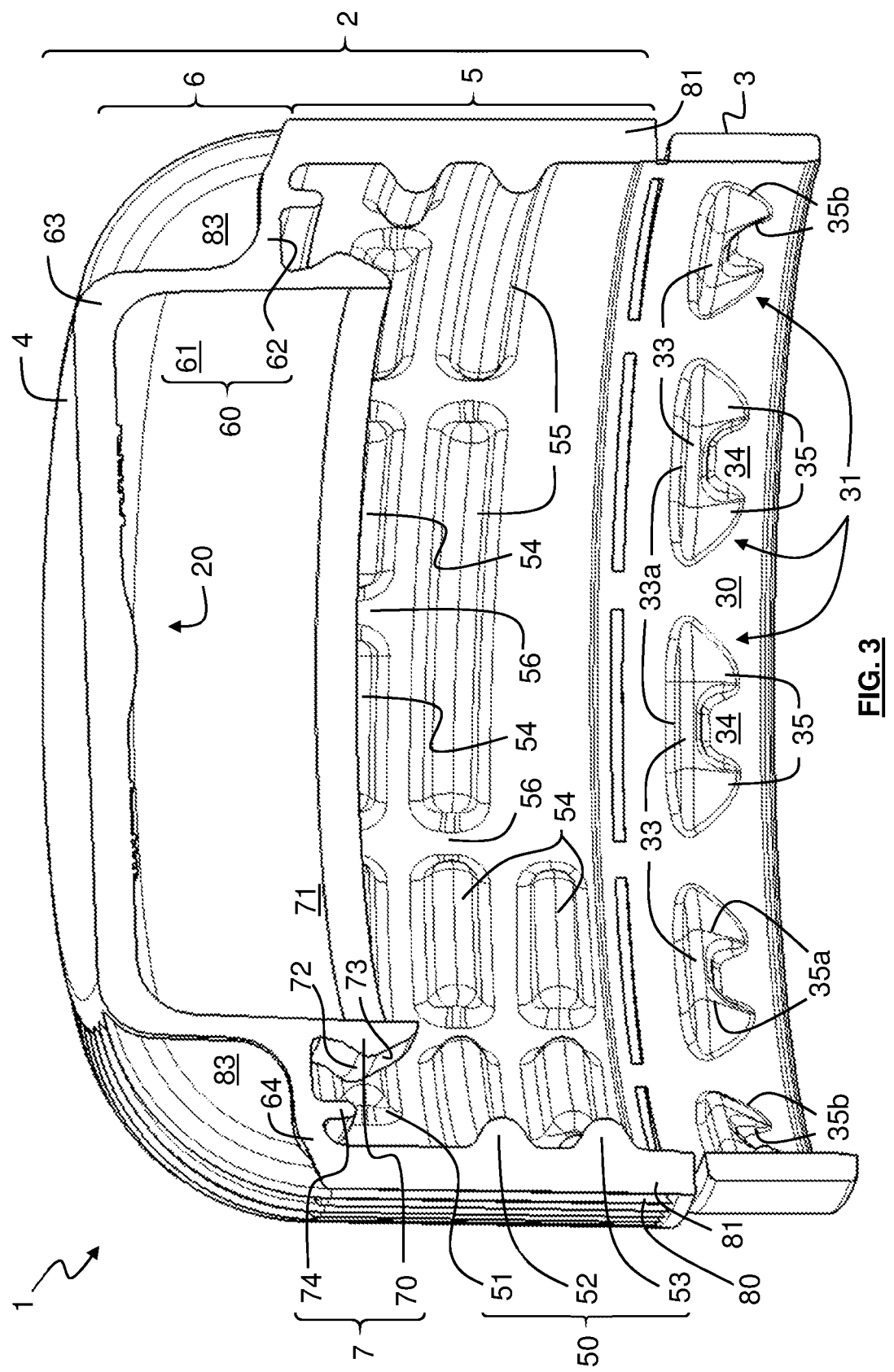
FIG. 3 depicts a perspective section view of the closure of FIGS. 1 and 2 through section A-A of FIG. 2.
Figure 4:
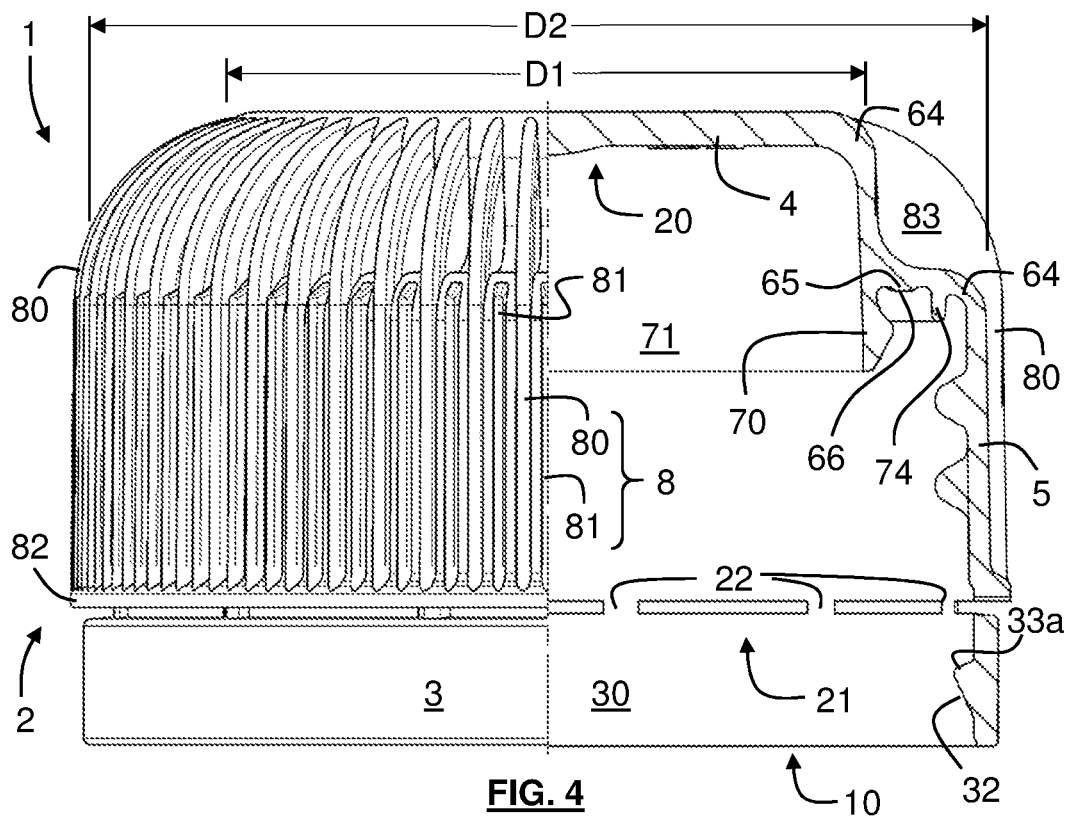
FIG. 4 depicts a partial section view of the closure of FIGS. 1 to 3 through a portion of the side wall between the axial external ribs.

With reference to FIGS. 1 to 5, there is depicted a closure 1 for sealingly closing a container neck 11. The closure 1 includes a tubular body 2 having a closed end 20 and an open end 21 and an annular tamper evidence band 3 connected to the open end 21 of the body 2 by a plurality of frangible bridges 22. The body 2 includes a top wall 4, a side wall 5 depending from the top wall 4, an intermediate wall 6 joining the side wall 5 to the top wall 4, a sealing system 7 depending from the intermediate wall 6 and a series of external knurls in the form of axial ribs 8. The top wall 4 describes the closed end 20 of the body 2 and the side wall 5 describes the open end 21 of the body 2 to which the tamper evidence band 3 is frangibly connected. The tamper evidence band 3 defines at its lower end an open end 10 of the closure 1.

The tamper evidence band 3 is substantially cylindrical in shape with an inner circumferential surface 30 and a plurality of retaining cams 31 protruding from the inner surface 30. Each retaining cam 31 includes a lead-in ramp 32 facing the open end 10 of the closure 1 and a catch or stop 33 facing the closed end 20 of the body 2. Each lead-in ramp 32 includes a central recess 34 formed therein to describe a pair of spaced ramp portions 35 on either side of the recess 34. Each recess 34 is provided by a scalloped-out portion formed by removing molding material from the cam 31 such that the base of the recess is substantially contiguous or flush with the inner surface 30 of the band 3.

The stop 33 of each cam 31 is in the form of a rib that extends circumferentially about the band 31 and spans the ramp portions 35 to provide with the ramp portions 35 a substantially U-shaped cam 31. The stop 33 provides a base of the U and the ramp portions 35 provide limbs thereof. In this embodiment, the stop 33 includes a radial engagement surface 33a extending substantially orthogonally relative to the inner surface 30 of the band 3 for engaging a flange 12 of the container neck 11. It will be appreciated that the engagement surface 33a may include a shallow slope, for example to facilitate ejection of the part from a mold.

Each ramp portion 35 includes a ramp surface 35a sloped toward the open end 10 of the closure 1 for contacting the flange 12 of the container neck 11. Each ramp portion 35 also includes sides 35b that taper from the stop 33 toward the open end 10 of the closure 1 such that as the flange 12 rides up the ramp portion 35, the width of the ramp portion 35 increases to absorb the resulting increased pressure applied to it by the flange 12.

As a result of the aforementioned shape of the retaining cams 31, the structure requires less material for the cams 31 to function than in known designs. The shape of the retaining cams 31 also provides a more consistent wall thickness. This reduces the risk of sink marks and enables the thickness of the tamper evidence band 3 to be reduced further than is generally practicable with conventional cam designs. The Applicant has observed that a reduced band thickness, together with the aforementioned cam shape more readily deforms plastically if manipulated to remove the band 3 after installation. This enhances the visual indication of tampering, thereby increasing the effectiveness of the tamper evidence function.

The top wall 4 is substantially disc-shaped and has a first diameter D1. The side wall 5 is annular and has a second diameter D2 larger than the first diameter D1. The side wall 5 includes threads 50 with multiple turns 51, 52, 53 formed by segments 54, 55 separated from one another by interruptions 56 that form axial venting passages. In accordance with the present invention however, some segments 55 are uninterrupted in the region thereof that is aligned axially with an interruption 56 in another of the turns 51, 52, 53.

The Applicant has determined that the omission of an interruption 56 in one of the turns 51, 52, 53 is surprisingly effective at withstanding excessive torque being applied to the closure 1 during application to a container neck 11. More particularly, the uninterrupted segments 55 mitigate damage to the threads 50 without compromising the ability of the closure 1 to vent the pressurised contents of the container.

The intermediate wall 6 includes an annular step 60 formed of a first, axial wall portion 61 and a second, radial wall portion 62. The axial wall portion 61 depends from the periphery of the top wall 4 and is joined thereto by a first shoulder 63, which provides a rounded, substantially orthogonal transition about the periphery of the top wall 4. The radial wall portion 62 joins the lower edge of the axial wall portion 61 portion to the top of the annular side wall 5 by a second shoulder 64, which also provides a rounded, substantially orthogonal transition about an inner periphery of the radial wall portion 62. The radial wall portion 62 also includes seven projections or pads 65 depending therefrom and spaced equally thereabout. Each pad 65 includes an abutment surface 66 against which the top surface 13 of the container neck 11 abuts when the closure 1 is installed thereon. Each pad 65 includes sides which slope from the abutment surface 66 to the radial wall portion 62, such that the abutment surface 66 forms a peak of the pad 65. Thus, the pads 65 together describe a composite abutment surface 66 that engages the top surface 13 of the container neck 11.

An extension of the preform is therefore described from the abutment surface to the top of the top wall. An effective closure height is described from the base of the side wall to the top of the top wall and an overall closure height described from the base of the tamper evidence band to the top of the top wall. In this embodiment, the extension is approximately 35% of the effective closure height and is approximately 30% of the overall closure height.

The sealing system 7 includes an internal olive seal 70 depending from the join between the axial wall portion 61 and the radial wall portion 62 of the intermediate wall 6 and is substantially aligned with the axial wall portion 61 such that it provides an extension thereof. The olive seal 70 is substantially cylindrical in shape with an inner surface 71 that is contiguous with and substantially parallel to the inner surface of the axial wall portion 61 and an outwardly projecting bead 72 adjacent its lower, free edge. The olive seal 70 also includes a tapered, outer lead-in 73 extending from its lower, free edge to the peak of the bead 72 for engaging the inner edge of the top surface 13 of the container neck 11. The sealing system also includes an outer, annular seal 74 for engaging an outer surface 14 of the container neck 11. The outer seal 74 is adjacent, but spaced from, the second shoulder 64 joining the radial wall portion 62 and the side wall 5.

Figure 5:
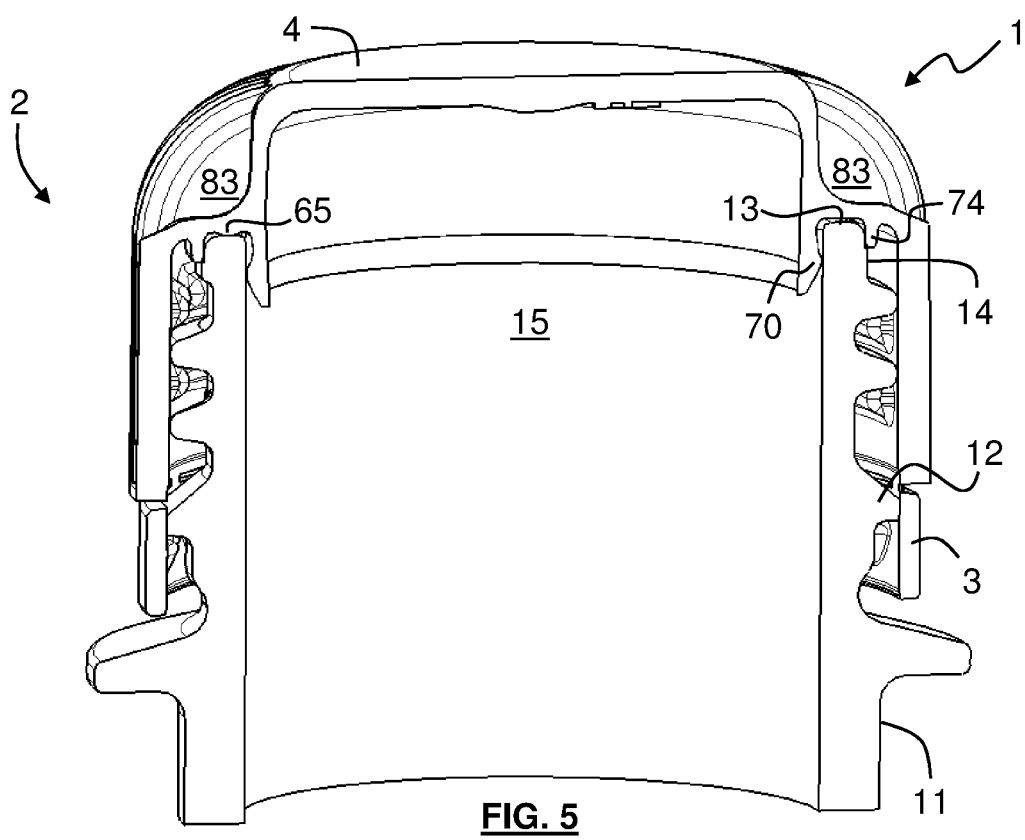
FIG. 5 is a perspective section view similar to that of FIG. 3 showing the closure installed on the neck of a beverage bottle.

It will be appreciated that when the closure 1 is installed on the container neck 11, as illustrated in FIG. 5, a central portion of the top surface 13 of the container neck 11 abuts the composite abutment surface 66 formed by the pads 65 and the sealing system 7 seals against both the inside and the outside of the container neck 11. More specifically, the bead 72 of the olive seal 70 seals against an inner surface 15 of the container neck 11, while the outer seal 74 seals against the outer surface 14 of the container neck 11.

The pads 65 are located centrally between the olive seal 70 and the outer seal 74 and their sides slope toward the seals 70, 74, but join the radial wall portion 62 at a location spaced from the seals 70, 74 such that the seals 70, 74 deform about a continuous annular hinge portion that is spaced from the pads 65. This ensures an even deformation of the seals 70, 74 about their entire circumference by avoiding localised thickening that would be present in the region of the pads 65 if they were joined to the base of the seals 70, 74.

The external knurls or axial ribs 8 include a first set of ribs 80 and a second set of ribs 81 which alternate, wherein each second rib 81 is located between each pair of first ribs 80. The width of the first and second ribs 80, 81 is substantially the same, but the first ribs 80 are longer than the second ribs 81. The first ribs 80 extend from the top wall 4 to a ring 82 at the lower edge of the side wall 5. The second ribs 81 extend from the intermediate wall 6 to the ring 82 at the lower edge of the side wall 5. The first ribs 80 include a quarter-round portion 83 extending from the outer surfaces of the annular step 60 formed by the intermediate wall 6. As a result, the first ribs 80 provide a gripping feature that extends along the entire length of the body 2 of the closure and mask the step 60 to provide an overall profile similar to a more conventional closure 1.

However, molding the first ribs 80 requires corresponding projections in the molding surface of the mold (not shown). The depth of the first ribs 80 presents some limitations on the spacing required for the mold to provide adequate cooling and to mitigate the susceptibility of damage to the projections on the molding surface. In order to increase the density of the ribs 8, the second ribs 81 are provided between the first ribs 80, which terminate at the annular step 60 and so do not include the quarter-round portion 83. As a result, the density of the ribs 8 on the side wall 5 is twice the density about the annular step 60 to improve the griping performance about the side wall 5.

It will be appreciated by those skilled in the art that several variations to the aforementioned embodiments are envisaged without departing from the scope of the invention. It will also be appreciated by those skilled in the art that any number of combinations of the aforementioned features and/or those shown in the appended drawings provide clear advantages over the prior art and are therefore within the scope of the invention described herein.

The invention claimed is:

1. A closure for sealingly closing a neck opening of a container, the closure comprising a tubular body having a closed end and an open end and an annular tamper evidence band frangibly connected to the open end of the tubular body;
   the tamper evidence band comprising a plurality of retaining cams each protruding from its inner surface;
   at least one retaining cam comprising a catch or stop for engaging, in use, a tamper evidence flange on the container neck during removal of the closure from the container, and a lead-in ramp for engaging, in use, the flange as the neck is introduced into the open end of the tubular body;
   wherein the lead-in ramp is further configured to include sides that taper toward one another away from the stop and forming an arched recess within the lead-in ramp such that, as the flange rides up the ramp portion, the width of the ramp portion increases to absorb the resulting increased pressure applied to it by the flange.

2. A closure according to claim 1, wherein the tamper evidence band comprises a radial thickness that is less than the radial thickness of the tubular body of the closure.

3. A closure according to claim 2, wherein the recess is in a central portion of the lead-in ramp to define two or more spaced ramp portions for contacting the flange of the container neck.

4. A closure according to claim 3, wherein at least part of the recess between the ramp portions is contiguous or flush with the inner surface of the tamper evidence band.

5. A closure according to claim 4, wherein the stop faces the closed end and spans the spaced ramp portions.

6. A closure according to claim 5, wherein the at least one cam is substantially U-shaped, each ramp portion comprising a ramp surface sloped toward an open end of the tamper evidence band for contacting the flange of the container neck and the stop having a substantially radial surface spanning the spaced ramp portions for engaging the flange.

7. A closure according to claim 1 comprising a top wall describing the closed end and an annular side wall depending from the top wall and describing the open end of the body, the side wall comprising threads including two or more turns each having a plurality of interruptions to form axial venting passages, wherein one of the turns includes an uninterrupted portion aligned axially with an interruption in another of the turns.

8. A closure according to claim 7, wherein the top wall comprises an abutment depending therefrom and having an abutment surface for abutting against a top surface of the container neck.

9. A closure according to claim 8, wherein the abutment comprises a plurality of projections depending from and spaced circumferentially about the top wall, each projection providing part of the abutment surface.

10. A closure according to claim 9 comprising an intermediate wall between the side wall and the periphery of the top wall, the top wall having a first diameter and the annular side wall having a second diameter larger than the first diameter, the intermediate wall comprising an annular step having a first, axial portion depending from the periphery of the top wall and a second, radial portion joining the lower edge of the first portion to the annular side wall, wherein the radial portion comprises the abutment or the abutment surface.

11. A closure according to claim 10, wherein the projections depend from and are spaced circumferentially about the radial portion.

12. A closure according to claim 11 comprising an inner annular seal depending from an inner part of the radial portion and an outer annular seal depending from an outer or intermediate part of the radial portion, wherein the projections are disposed between and spaced from each of the inner and outer seals.

13. A closure according to claim 10, wherein each projection tapers from the radial portion to its abutment surface.

14. A closure according to claim 7 comprising a plurality of axial external ribs radially projecting from the outer surface of the side wall including first and second ribs, wherein the first ribs are longer than the second ribs.

15. A closure according to claim 12, wherein the first ribs extend from the top wall toward the base of the side wall and the second ribs extend from the intermediate wall toward the base of the side wall.

16. A closure according to claim 13, wherein each second rib is between a pair of first ribs.

17. A closure according to claim 8 comprising an extension described from the abutment surface to the top of the top wall and an effective closure height described from the base of the side wall to the top of the top wall, wherein the extension is at least 10% of the effective closure height.

18. A closure according to claim 17, wherein the extension is at least 25% of the effective closure height.

19. A closure according to claim 17 comprising an overall closure height described from the base of the tamper evidence band to the top of the top wall, wherein the extension is at least 10% of the overall closure height.

20. A closure according to claim 17, wherein the extension is at least 20% of the overall closure height.

21. A mold stack comprising a plurality of mold inserts which, when in a molding configuration, together describe a molding cavity for molding a closure according to claim 1.

22. A mold comprising the mold stack according to claim 21.

23. A molding system comprising the mold according to claim 22.

\* \* \* \* \*